Feb. 25, 1958 J. R. HOTCHKIN 2,824,480

CIRCUIT DEVICE AND NUT USEFUL THEREIN

Filed Dec. 23, 1953

INVENTOR

James Rowland Hotchkin

BY

Ramsey, Chisholm + Hilder

ATTORNEYS

United States Patent Office 2,824,480

Patented Feb. 25, 1958

2,824,480

CIRCUIT DEVICE AND NUT USEFUL THEREIN

James Rowland Hotchkin, Short Hills, N. J., assignor to The Palnut Company, Irvington, N. J., a corporation of New Jersey Application December 23, 1953, Serial No. 399,864

4 Claims. (Cl. 85—32)

This invention relates to a screw-adjustable circuit device and, in its presently preferred form, it embodies a single nut which serves the dual purpose of (*a*) securing the circuit device in mounted position on a chassis plate and (*b*) affording facile adjustment of the screw while holding it against fortuitous rotation. Embraced within the invention is a nut of the type embodied in the circuit device.

Many types of electrical apparatus customarily embody various elements and circuit devices which are mounted on a metallic chassis plate. When in operation, the chassis plate is usually at zero or ground potential; and in many circuits various of the circuit devices have one terminal or "side" which is also at ground potential. Each such terminal or side may be electrically connected to the chassis plate, and the plate itself serve as the circuit connection between ground-potential terminals of the circuit devices involved.

In many instances the circuit device is one which requires final adjustment after the entire piece of electrical equipment has been assembled. Often the circuit device is so designed that the adjustment can be made by turning a screw. In the prior art, generally speaking, one means has been used to secure the circuit device to the chassis plate and another means has been used to hold the screw in adjusted position. In certain prior art constructions, these two means have been united in a single fastener. Such constructions have their advantages but their cost is not as low as would be desirable.

Among the objects of the present invention are to provide a screw-adjustable circuit device in which a single simple means serves to secure the device to a chassis plate and also to afford facile adjustment of the screw while holding it against fortuitous rotation.

Another object of the invention is to provide such a circuit device in which such means makes reliable electrical connection between the screw and the chassis plate on which the device is mounted.

Another object of the invention is to provide such a circuit device in which such means is a single sheet-metal nut.

A further object of the invention is to provide such a circuit device which affords easy adjustment of the holding force imposed upon the screw.

A still further object of the invention is to provide a reliable nut, useful in such a circuit device, which may be rapidly and economically formed from sheet metal on a quantity production basis.

Further objects and objects relating to details of manufacture, construction, and use will more definitely appear in the detailed description to follow.

My invention is defined in the claims. Where, in referring to the nut, reference is made to the top, side, bottom or the like, such terms have their usual meaning with regard to the nut itself and are not related to the position of the nut axis in any particular assembly. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification, in which:

Figure 1:
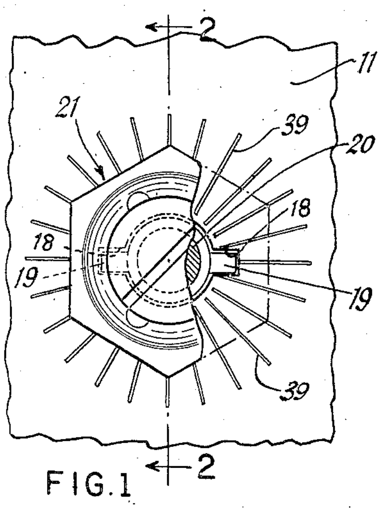
Fig. 1 is a fragmentary elevation of a chassis plate of electrical apparatus, such as a radio, at the location of a trimming condenser, parts of the condenser-adjusting screw and of the resilient nut on the screw being broken away for clarity of illustration.
Figure 2:
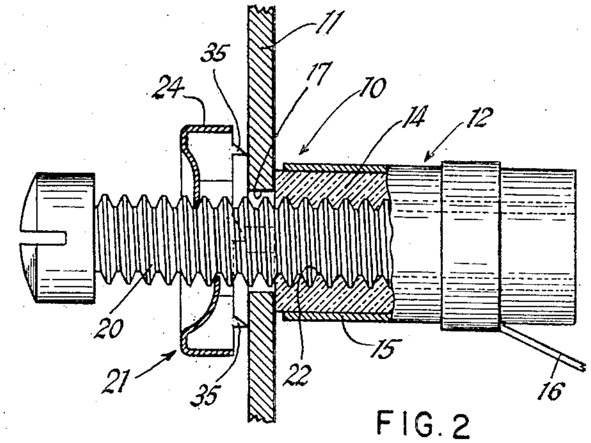
Fig. 2 is a view in vertical section taken generally on the line 2—2 of Fig. 1, the chassis plate and the resilient nut being shown in section, the screw being shown in elevation, and the condenser body being shown partially in section and partially in elevation.

In Figs. 1 and 2 there is shown a screw-adjustable condenser, designated generally by the reference character 10, mounted on a metal chassis plate 11. Such condensers are employed to provide for accurate, final adjustment of the capacity in an electrical circuit. The condenser has a body which is composed essentially of an insulating ceramic tube 14 and a surrounding cylindrical metal sheath 15, the sheath constituting a first plate of the condenser. Tube 14 has screw threads 22 molded on its inner wall to receive a screw 20 which constitutes the second plate of the condenser, the screw being adjustable to vary the capacity of the condenser. Sheath 15 terminates short of chassis plate 11 and is provided with a lead wire 16 for connection to the circuit (not shown).

The unsheathed end of ceramic tube 14 is positioned against the chassis plate coaxial with a hole 17 through the plate. This end of tube 12 is formed with integral splines 19, 19 (Fig. 1) which project axially and radially and telescope into corresponding keyways 18, 18 which extend radially outward from hole 17 in the chassis plate. These interfitting formations hold the condenser body against rotation.

As shown in Fig. 2, the adjusting screw 20 extends loosely through the hole 17 in the chassis plate and mates with nut 21 which engages the opposite side of the chassis plate and holds the condenser in mounted position on the chassis plate. As will more fully appear later, the nut-and-screw arrangement is such that the screw may be adjusted to vary the capacity of the condenser without affecting the mounting of the condenser on the chassis plate. Further, the nut exerts frictional holding force on the screw whereby the screw may readily be adjusted and will thereafter stably remain in such adjusted position; and this frictional holding force is selectively variable. The resilient nut also serves in this construction to complete the circuit from the screw to the chassis plate.

Figures 3, 4, 5, 6, 7:
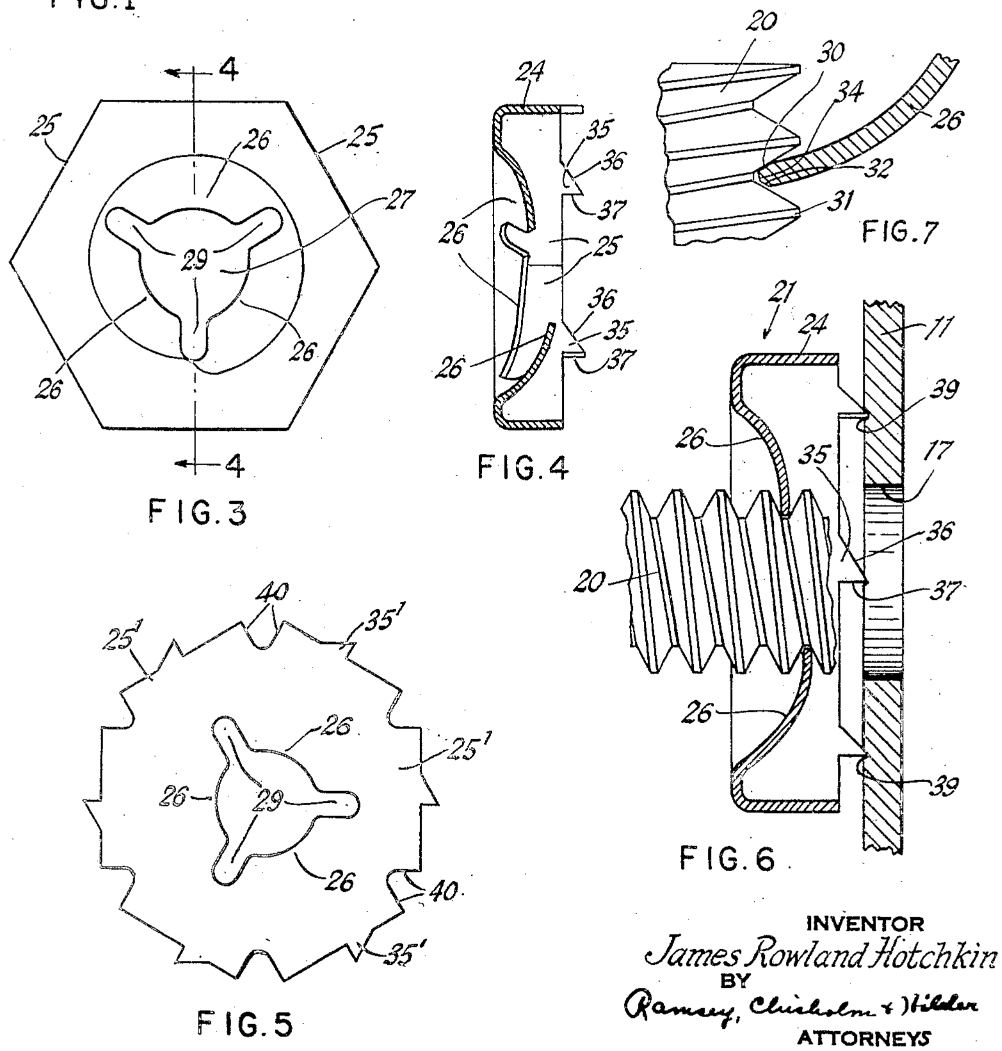
Fig. 3 is an elevation on an enlarged scale of the resilient nut shown in Figs. 1 and 2.
Fig. 4 is a view in vertical section of the nut taken generally on the line 4—4 of Fig. 3.
Fig. 5 is a plan view of the sheet metal blank from which the resilient nut is formed.
Fig. 6 is an enlarged, fragmentary view of a portion of the condenser assembly which includes the nut, the nut and the chassis plate bing shown in section along an axial plane of the nut, and the screw being shown in elevation.
Fig. 7 is a still further enlarged, fragmentary view showing the manner in which the nut engages the screw and holds it against fortuitous rotation, the nut being shown in axial section, and the screw being shown in elevation.

The resilient nut 21 is a one-piece sheet-metal nut which may be made from a blank such as shown in Fig. 5. As viewed in Fig. 1, the top of the nut is generally concave and merges with a horizontal rim that in turn merges with a side wall 24. The side wall is composed of oppositely disposed flats 25 (six shown) constituting wrench faces. The top of the nut has a plurality (three shown) of thread-engaging segments 26 extending inwardly and downwardly. Collectively, these segments constitute a thread engager and define a central screw-receiving opening 27. The thread-engaging segments are separated from each other by radially extending slots 29. The inner edges of the segments are formed to lie on a helix, the hole 27 defined by them being of such diameter that the inner edges of the segments fit between the lands or convolutions of the thread on the screw in the manner shown in Figs. 2, 6, and 7.

The innermost edge of each segment 26 is beveled at its top and bottom at an angle approximating the angle of the V thread of the screw. The upper inner beveled edge 30 (Fig. 7) of each segment contacts the bottom face of the thread land 31, the bottom inner edge 32 of each segment being slightly spaced from the upper face of the thread land, and the tip 34 of the inner edge being spaced from the root of the thread on the screw. As a result, the nut is capable of effectively cooperating with all screws of its size having thread diameters within ordinary commercial tolerances.

The nut is provided with a plurality of integral teeth 35, one projecting from the center of the lower edge of each flat 25 of the side wall. As regards each tooth, the plane of the metal of the tooth is the same as the plane of the metal of its flat 25. Each tooth has a leading edge 36 slanting upwardly from the point of the tooth and a trailing edge 37 disposed in an axial plane of the nut. By "leading edge" is meant that edge of the tooth which leads when the nut is turned to travel down the screw into engagement with the chassis plate. The upper face of the chassis plate may be provided with a series of angularly spaced grooves or score marks 39, located radially of the hole 17, in which the points of the teeth 35 may rest to hold the nut securely against accidental loosening. In the organization shown, there are twenty-four such score marks and six teeth. Thus, the teeth will rest in the score marks in any one of twenty-four angular positions of turning of the nut. The nut may, however, be adjusted to a position in which the teeth lie between score marks; in fact, the score marks may ordinarily be omitted entirely, since the teeth, when made as shown, dig into the chassis plate and hold the nut against loosening.

In making the assembly shown in Figs. 1 and 2, the nut 21 is assembled on the screw 20 in approximately the operating position. The condenser body is placed in position against the chassis plate, and then the screw is inserted through the hole in the chassis plate and turned into the condenser body until the nut touches the chassis plate. The nut is then turned on the screw to tighten it further against the chassis plate so that it imposes the desired retarding torque on the screw. When the nut has been thus adjusted the teeth 35 hold the nut against rotation in either direction and the screw may be either advanced into the condenser body or retracted therefrom to adjust the condenser as required, without disturbing the nut. The frictional holding torque which the nut imposes on the screw may be increased by tightening the nut downwardly on the screw, and decreased by reverse movement of the nut.

The resilience of the segments 26 causes their beveled inner edges constantly to be urged into contact with the bottom face of the thread land. Because of the angle of contact between the screw thread and the segments of the nut, the nut is constantly urged into centered position with respect to the screw. The tips 34 of the segments 26 are initially free of the root of the thread of the screw and move outwardly as the nut is tightened. Thus, the nut does not "lock" with the screw; instead, it imposes smooth braking action thereon. The broad area of contact between the land and the beveled edges 30 of the segments prevents the segments from digging into the land, and insures reliable electrical contact between screw and nut even during adjustment of the screw.

The sharp points of the teeth 35 grip the chassis plate firmly. Such grip of the teeth on the plate prevents undesired retrogression of the nut without, however, preventing the nut from being loosened with a wrench when desired. When the nut completes the circuit from screw to chassis plate, the teeth insure a reliable electrical contact between the nut and plate. Since each tooth 35 lies beneath the center of a flat 25, the upward force on each of the teeth when the nut is turned lies in the plane of its flat. Thus, the teeth are strongly backed up by the flats and there is little if any tendency to bend the teeth out of alignment with the flat when the nut is turned.

As indicated, the nut may be made from a sheet-metal blank such as shown in Fig. 5. In such figure, the parts of the nut at the screw-receiving opening are designated by the same characters as in the finished nut. The parts of the blank which become the side-wall flats are shown at 25', and the teeth are shown at 35'. The nut may be shaped in appropriate dies which form the central portion of the blank into the concave shape shown, bend the segments into the helical thread-engaging shape, bevel the tips of the segments, and cup the blank so that the parts 25' are bent into vertical position with the edges 40 of parts 25' meeting to form the vertical edges between flats. The nuts are formed of sheet metal such as steel, and after being shaped are heat-treated to harden and temper them so as to render them springy.

In order to give the resilient nut the necessary flexibility to provide a smooth tension on the screw, it is made with a relatively low ratio of stock thickness to thread pitch. A stock thickness of .009" for a 6–32 x 5/16" resilient nut, giving a gauge-to-pitch ratio of .288, operates satisfactorily in the described adjustable-screw assembly.

I claim:

1. In electrical apparatus in which (*a*) a screw is connected into a circuit and is adjustably threaded into a member for varying a characteristic of the circuit, (*b*) the screw passes through another member which has a fixed surface that extends outwardly from the screw, and (*c*) a nut element is interposed between the screw and the fixed surface for tightening against the surface and imposing adjustable braking force on the screw; the improvement which comprises: the nut element having a plurality of axially-yielding spring sectors extending downwordly and thence inwardly between the convolutions of the screw-thread, the tips of the sectors being chamfered top and bottom, the bottoms of the sectors being in spaced relation to the top side of the thread and the top chamfers of the sectors yieldingly engaging the bottom side of the thread, and the tips of the sectors being in spaced relation to the root of the thread, and at radial distances from the root which increase as the nut element is tightened against the fixed surface, and the nut element also having sharp points which bite into said fixed surface.

2. Electrical apparatus as in claim 1 in which the nut element is a hexagonal sheet-metal shell and the sharp points are sheet-metal projections lying in planes of the side wall of the shell and extending from the centers of the flat sides of the hexagonal formation.

3. In a screw-and-nut assembly useful as the adjusting screw and screw-braking nut of electrical apparatus in which (*a*) the screw passes through a member which has a fixed surface that extends outwardly from the screw and (*b*) the nut is tightened against the fixed surface for imposing adjustable braking force on the screw; the improvement which comprises: the nut having means for yieldingly engaging the thread of the screw, said means including a plurality of axially-yielding spring sectors extending downwardly and thence inwardly between the convolutions of the screw-thread, the tips of the sectors being chamfered top and bottom, the bottoms of the sectors being in spaced relation to the top side of the thread and the top chamfers of the sectors yieldingly engaging the bottom side of the thread, and the tips of the sectors being in spaced relation to the root of the thread and at radial distances from the root which increase as the nut is tightened against the fixed surface; and the nut also having sharp points which bite into said fixed surface.

4. A screw-braking nut for interposing between an adjustable screw and a member through which the screw passes and which has a fixed surface that extends outwardly from the screw, said nut comprising: a hexagonal sheet-metal shell; means extending inwardly from the shell for yieldingly engaging the thread of the screw, said means including a plurality of axially-yielding spring sectors extending downwardly and thence inwardly between the convolutions of the screw thread, the tips of the sectors being chamfered top and bottom, the bottoms of the sectors being in spaced relation to the top side of the thread and the top chamfers of the sectors yieldingly engaging the bottom side of the thread, and the tips of the sectors being in spaced relation to the root of the thread and at radial distances from the root which increase as the nut is tightened against the fixed surfaces; and sharp points which bite into said fixed surface, said points being sheet-metal projections lying in planes of the side wall of the shell and extending from the centers of the flat sides of the hexagonal formation.

References Cited in the file of this patent

UNITED STATES PATENTS

| | | |
|---|---|---|
| 1,899,715 | Olson | Feb. 28, 1933 |
| 1,911,384 | Olson | May 30, 1933 |
| 2,081,065 | Place | May 18, 1937 |
| 2,102,098 | Sickles | Dec. 14, 1937 |
| 2,284,081 | Beggs | May 26, 1942 |
| 2,435,079 | Hotchkin | Jan. 27, 1948 |
| 2,504,758 | Thias | Apr. 18, 1950 |
| 2,743,461 | Urbas | May 1, 1956 |

FOREIGN PATENTS

| | | |
|---|---|---|
| 477,143 | Great Britain | Dec. 22, 1937 |